United States Patent [19]

Amos

[11] Patent Number: 5,183,390

[45] Date of Patent: Feb. 2, 1993

[54] METHOD OF FORMING A TRAILING EDGE ON A STEAM TURBINE BLADE AND THE BLADE MADE THEREBY

[75] Inventor: Dennis R. Amos, Rock Hill, S.C.

[73] Assignee: Westinghouse Electric Corp., Pittsburgh, Pa.

[21] Appl. No.: 727,748

[22] Filed: Jul. 10, 1991

[51] Int. Cl.$^5$ .......................................... B63H 1/26
[52] U.S. Cl. ............................... 416/224; 416/241 R; 29/889.7; 29/889.1; 29/889.71; 228/112
[58] Field of Search ......... 278/112, 114, 119; 416/224, 241 R; 29/889.1, 889.7, 889.71

[56] References Cited

U.S. PATENT DOCUMENTS

| | | | |
|---|---|---|---|
| 3,537,172 | 11/1970 | Vozneseksky | 228/112 |
| 3,982,854 | 9/1976 | Berry et al. | 416/213 |
| 4,079,491 | 3/1978 | Richardson | 29/157.1 R |
| 4,884,736 | 12/1989 | Goddard | 228/2 |
| 4,905,883 | 3/1990 | Searle | 228/2 |
| 4,930,675 | 6/1990 | Bedford et al. | 228/114 X |
| 4,934,583 | 6/1990 | Patsfall | 228/44.3 |
| 4,995,544 | 2/1991 | Searle | 228/2 |
| 5,033,938 | 7/1991 | Fraser et al. | 228/119 X |
| 5,060,842 | 10/1991 | Qureshi et al. | 228/119 |
| 5,062,205 | 11/1991 | Fraser | 228/119 X |

FOREIGN PATENT DOCUMENTS

| | | | |
|---|---|---|---|
| 165507 | 7/1987 | Japan | 416/241 R |
| 295803 | 12/1988 | Japan | 416/241 R |
| 572789 | 10/1945 | United Kingdom . | |
| 1018412 | 1/1966 | United Kingdom | 228/112 |

OTHER PUBLICATIONS

ASM Committee, "Friction Welding," Chapter from *American Society for Metals Handbook*, 9th ed., 1983.
"Friction Surfacing," *The Welding Institute Technology Data Sheet*, publication date, if any, unknown—came into inventor's possession in spring 1989.
W. M. Thomas, "Solid Phase Cladding by Friction Surfacing," Paper No. 18, *Welding for the Process Industries* (Apr. 1988).
E. D. Nicholas, "Friction Welding Non-Circular Sections with Linear Motion-A Preliminary Study," *The Welding Institute*, (1987).

Primary Examiner—Edward K. Look
Assistant Examiner—Todd Mattingly

[57] ABSTRACT

A steam turbine blade is provided having a trailing edge portion formed from an erosion resistant material deposited on the blade airfoil by a friction surfacing method. According to the method, a rotating consumable rod of erosion resistant material is placed in contact under axial load against a bonding surface formed on the airfoil, thereby causing a portion of the rod adjacent the bonding surface to be plasticized. The rod then traverses the surface linearly leaving in its wake a layer of erosion resistant material bonded to the airfoil by a high quality metallurgical bond. The layer is then ground to form the smooth contour desired for the trailing edge.

17 Claims, 2 Drawing Sheets

METHOD OF FORMING A TRAILING EDGE ON A STEAM TURBINE BLADE AND THE BLADE MADE THEREBY

FIELD OF THE INVENTION

The current invention concerns a steam turbine blade having an erosion resistant trailing edge. More specifically, the current invention concerns a steam turbine blade having a portion of its trailing edge formed from a strip of Stellite 6B TM bonded to the blade airfoil by a friction surfacing method.

BACKGROUND OF THE INVENTION

The blades in the last few rows of a low pressure steam turbine are subject to erosion as a result of impact with moisture droplets which form in the steam in this area of the turbine. This erosion is most severe in the trailing edge portion of the airfoil near its tip. Since the ferrous alloys from which such blades are typically forged have high strength but less than optimum erosion resistance, in the past, the rate of such erosion has been retarded by brazing a thin strip of a wear resistant material, such as Stellite 6B TM, onto the upper one-half to one-third of the trailing edge.

Unfortunately, brazing has several disadvantages. First, the metallurgical bond achieved by brazing is rarely 100% and bonds of only 80% must often be accepted. Second, the heat input associated with the brazing tempers the alloy from which the airfoil is forged, thereby lowering its mechanical strength and causing geometric distortion. Third, since microporosity is inherent in brazing, small pits are formed, thereby creating potential crack initiation sites.

It has long been known that good metallurgical bonding can be obtained by friction welding. Moreover, it has been suggested that friction welding be used to bond the airfoil portion of a turbine blade to its root portion or to a disc—see, U.S. Pat. Nos. 4,934,583 (Patsfall); 4,884,736 (Goddard) and 3,982,854 (Berry et al.). In addition, it has been suggested that friction surfacing, as such, can be applied to turbine blades—see, W. M. Thomas, "Solid Phase Cladding By Friction Surfacing", *Welding for the Process Indiustries* Paper 18 (1988). However, a method for utilizing a friction surfacing technique to apply a wear resistant material, such as Stellite 6B TM, to the trailing edge of a steam turbine blade forged from the types of alloys typically used for such blades has not heretofore been developed.

As discussed in U.S. Pat. No. 4,079,491 (Richardson), the high temperature necessary to achieve the plasticity required for friction welding of wear resistant materials such as Stellite 6B TM to certain base alloys, such as stainless steel, imposes many practical difficulties owing the tendency for excessive temperature to be created in the base alloy. The problem of over-temperaturing the base alloy is especially important for steam turbine blades since the alloys from which they are formed are carefully heat-treated to obtain maximum strength and such strength can be lost by subsequent over-temperature.

Accordingly, it would be desirable to provide a workable method whereby a trailing edge could be formed on a steam turbine blade from a wear resistant material using a friction surfacing technique without generating excessive temperature in the blade.

SUMMARY OF THE INVENTION

It is the object of the current invention to provide a steam turbine blade having an erosion resistant trailing edge formed by a friction surfacing technique.

It is another object of the current invention to provide a method of forming a wear resistant material, such as Stellite 6B TM, on the trailing edge of an airfoil forged from one of the types of ferrous alloys suitable for steam turbine blading.

It is still another object of the current invention that the forming method result in a sound metallurgical bond without producing excessive heat in the airfoil alloy.

These and other objects are accomplished in a steam turbine blade having (i) a root portion and (ii) an airfoil portion extending from the root portion and having an edge portion and a center portion disposed adjacent the edge portion. The center portion is formed from an iron alloy having approximately 11.5 to 12.5% chromium. Alternatively, the center portion may be formed from an iron alloy having approximately 15.5 to 17.5% chromium and 3.0–5.0% nickel. At least a first portion of the edge portion is formed from a wear resistant alloy comprising cobalt, nickel, chromium, tungsten, manganese and selenium, such as Stellite 6B TM, by a friction surfacing method.

A method of forming an erosion resistant trailing edge on a steam turbine blade airfoil is also disclosed. The method comprises the steps of (i) forming a bonding surface on the airfoil adapted to receive the wear resistant trailing edge, (ii) rotating a rod formed from a second material, (iii) placing the rotating rod in contact with the airfoil bonding surface, (iv) pressing the rotating rod against the bonding surface with an axial force, thereby plasticizing a portion of the rod adjacent the bonding surface, and (v) moving the rotating rod approximately linearly relative to the bonding surface while maintaining the axial force, thereby bonding the plasticized portion of the rod to the bonding surface and forming a wear resistant trailing edge thereon.

DESCRIPTION OF THE PREFERRED EMBODIMENT

Figure 1:
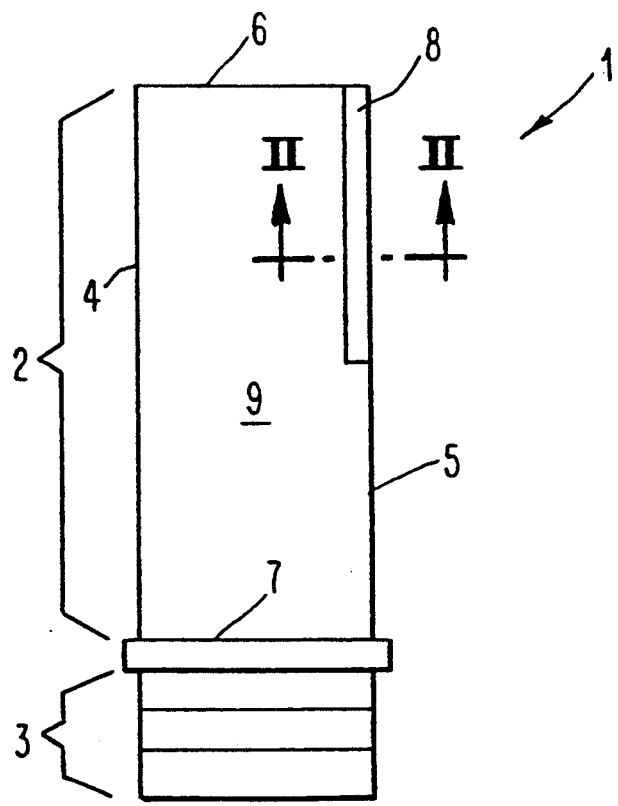
FIG. 1 is an elevation of a steam turbine blade.

There is shown in FIG. 1 a blade 1 from one of the last few rows of blades in a low pressure steam turbine. As is conventional, the blade 1 is comprised of an airfoil portion 2 and a root portion 3. The root portion 3 serves to attach the blade 1 to the rotor of a steam turbine. The airfoil 2, which is exposed to the steam flowing through the turbine, serves to extract the energy from the steam necessary to rotate the rotor. As shown in FIG. 1, the airfoil 2 is comprised of a leading edge portion 4, a trailing edge portion 5 and a center portion 9 disposed between the leading and trailing edge portions and adjacent to each. Moreover, the airfoil 2 has a tip portion 6 and a platform 7 which serves as the attachment point of the airfoil to the root 3.

As is well known in the art, there is a tendency for water droplets to form in the steam flowing through the lowest pressure portions of low pressure steam turbines. These water droplets are entrained in the steam flow and, as a result of centrifugal force, migrate outward toward the tips of the blades. The water droplets can cause harmful erosion of the trailing edge 5 of the blade airfoil 2 near its tip portion 6.

Typically the blades in the last few rows of blades in a low pressure steam turbine are formed by forging a ferrous alloy containing a relatively high chromium content. One such alloy contains approximately 15.5 to 17.5% chromium and 3.0 to 5.0% nickel. A second such alloy contains 11.5 to 13.0% chromium. Although these alloys have good mechanical strength, their erosion resistance is not optimum, resulting in higher than acceptable erosion rates in the trailing edge 5.

The problem of trailing edge 5 erosion is solved by providing the trailing edge portion 5 with a portion 8 having increased erosion resistance. According to the current invention, this is accomplished by forming portion 8 and bonding it to the center portion 9 of the airfoil using a friction surfacing technique that prevents the excessive buildup of heat in the turbine blade yet which results in a good metallurgical bond. In the preferred embodiment the increased erosion resistant portion 8 is formed from Stellite 6B (Stellite 6B is a trademark of Deloro Stellite, Inc.), the composition of which, by percent weight, is as follows: 0.9-1.40 C, 28.0-32.0 Cr, 3.0 max Ni, 1.5 max Mo, 3.5-5.5 W, 2.0 max Mn, 2.0 max Si, 3.0 max Fe, balance Co.

Figure 3:
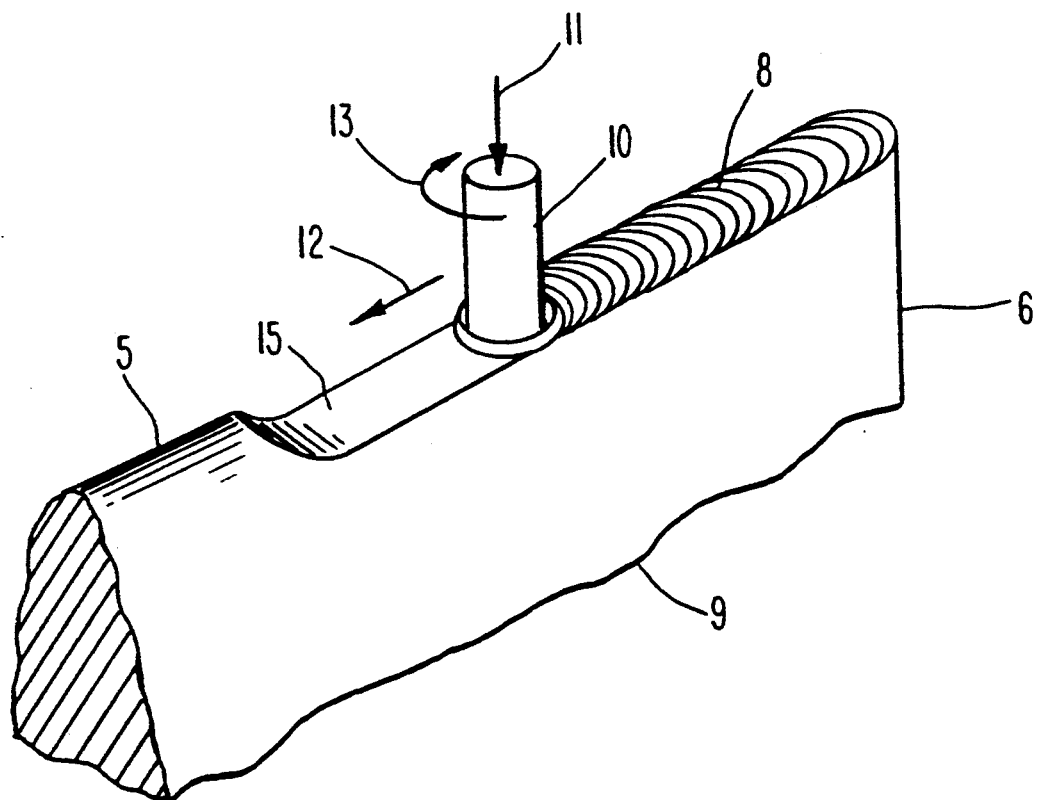
FIG. 3 is an isometric view of a portion of the trailing edge of the blade shown in FIG. 1 undergoing a friction surfacing.
Figure 4:
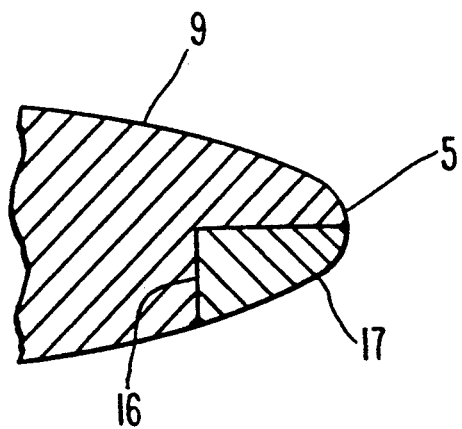
FIG. 4 is a cross-section similar to that shown in FIG. 2 showing an alternate embodiment of the trailing edge portion of the airfoil shown in FIG. 1.

As shown in FIG. 3, the trailing edge portion 8 is formed by first machining a bonding surface 15 in the upper one-half to one-third (depending on the erosion pattern in the particular blade row) of the trailing edge portion 5 of an airfoil 2 forged from either of the high chromium alloys mentioned above. Alternatively, since erosion is most severe on the inlet side of the blade, the bonding surface can be formed by machining a slot 16 in the inlet side of the blade at its trailing edge so that a trailing edge portion 17 such as that shown in FIG. 4 is produced.

Next, a consumable rod 10 is formed from an erosion resistant alloy, such as the aforementioned Stellite 6B TM, and rotated, as indicated by the arrows 13, at a predetermined speed. In the preferred embodiment, the temperature increase in the blade is minimized by maintaining the speed of the rod 10 in the range of approximately 320 to 340 RPM, most preferably 330 RPM. While maintaining rotation of the rod 10 in the aforementioned speed range, the rod is placed in contact with the surface 15. An axial force 11 is applied to the rod 10 so that the rod is pressed into the surface 15. In the preferred embodiment, with a rod having a diameter of approximately 18 mm (0.71 inch), as explained below, sufficient axial force 11 is maintained such that the burn-off rate—that is, the rate at which the length of the rod 10 is consumed—is maintained in the range of approximately 3.51 to 3.91 mm/sec (0.138 to 0.154 inch/sec), most preferably 3.71 mm/sec (0.146 inch/sec). The resulting contact under pressure between the rod 10 and the surface 15 produces a scouring action which disperses the oxide barrier, thereby facilitating the formation of a good bond.

Traditionally, friction welding has been accomplished by maintaining contact under pressure with one member rotating but not otherwise moving relative to the other member for a period of time, referred to as the "touch down" period. The touch down period was thought necessary to generate sufficient heat to cause a portion of the rod 10 adjacent the surface 15 to be plasticized, thereby forming a plasticized layer between the rod 10 and the surface 15, before linear motion is begun. However, according to the current invention, in order to minimize the temperature rise in the blade when Stellite 6B TM is applied to one of the aforementioned blade alloys, the touch down period is eliminated so that the rod 10 is moving linearly—in the preferred embodiment, at a speed of approximately 2.25 to 2.75 mm/sec (0.89 to 1.08 inch/sec), preferably approximately 2.5 mm/sec (0.98 inch/sec), as explained below—as well as rotating, when it initially contacts the bonding surface 15. This approach can be referred to as contact by a running start.

Thus, at the time contact occurs, the rod 10 is simultaneously undergoing rotation and linear motion relative to the surface 15, as indicated by the arrow 12 in FIG. 3—that is, the rod is moved along the surface 15 in a direction perpendicular to the axis of rotation of the rod. In the preferred embodiment, the lack of a touch down period and the slow rotational speed is offset by maintaining the relative linear speed between the rod 10 and the airfoil 2 at a low value of approximately 2.25 to 2.75 mm/sec (0.89 to 1.08 inch/sec), preferably approximately 2.5 mm/sec (0.98 inch/sec).

Once contact occurs, linear movement of the rod 10 continues over the surface 15 until the length of the surface has been traversed. The aforementioned axial force 11 and rotation are maintained throughout the linear motion. As a result, the plasticized layer continues its scouring action over surface 15. Note, however, that despite this scouring action, if the rod and airfoil materials are sufficiently reactive, a gas shield, such as argon, may be used.

To minimize the buildup of heat in the blade, it is important to minimize the mass of the rod 10 relative to the airfoil 2. Consequently, in the preferred embodiment, the diameter of the rod is approximately 18 mm (0.71 inch).

Thus, utilizing the method according to the current invention, the temperature rise is much greater in the rod 10 than in the airfoil 2. This is an important result, since, as previously discussed, excess temperature in the airfoil 2 would weaken the as-forged strength of the alloys from which it is formed.

As shown in FIG. 3, the process described above results in the bar 10 leaving a layer 8 of rod material (in the preferred embodiment Stellite 6B TM) in its wake. In the preferred embodiment, the layer 8 is approximately 0.89 mm (0.035 inch) thick and 1.9 cm (0.75 inch) wide. The thickness of the deposit is controlled by varying the linear speed of the rod 10.

Figure 2:
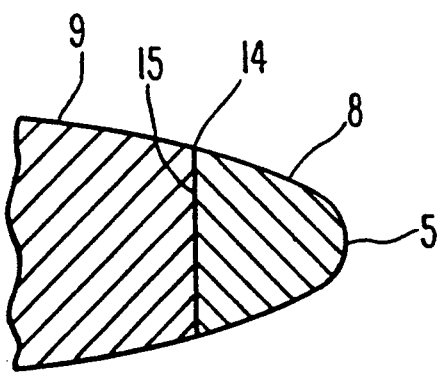
FIG. 2 is a cross-section through line II—II shown in FIG. 1.

When the rod 10 has reached the end of surface 15, the rod, still rotating, is withdrawn from the airfoil 2. The layer 8 is then ground to obtain the smooth contour desired for the trailing edge 5, as shown in FIG. 2. If necessary to obtain the desired thickness of the trailing edge portion, the layer 8 can be ground smooth and a second pass can be performed so that a second layer is formed on the first layer.

According to the current invention, the aforementioned parameters of rod rotational speed, axial contact force, rod/airfoil relative linear speed, and touch down period are carefully selected for the airfoil alloy and rod material so that (i) the temperatures generated in the airfoil 2 will not become so great as to weaken the airfoil alloy and (ii) the temperature of the rod 10 will be high enough to plasticize the portion of the rod adjacent the airfoil bonding surface 15, but not so high as to result in melting of the rod material, since such melting may result in excessive hardness and shrinkage cracks.

Metallurgical examination of the interface 14 between the layer 8 and the airfoil center portion 9, shown in FIG. 2, reveals that a metallurgical bond of almost 100% is achieved. Areas in which there may be a lack of bonding, such as along the outer edges of the layer 8, are eliminated by grinding away the unbonded portions of the layer.

Note that no preheat or external heating of the rod 10 or airfoil 2 is required. Nor is any surface preparation required, other than grinding of the bonding surface 15.

Although the method has been disclosed with reference to forming a trailing edge portion of Stellite 6B TM on steam turbine blades formed from two specific blade alloys, the friction surfacing technique is also applicable to forming layers or coatings of other corrosion or erosion resistant materials on other portions of steam turbine blades or on other turbo-machine airfoils, such as gas turbine blades, which are formed from similar types of alloys. Accordingly, the present invention may be embodied in other specific forms without departing from the spirit or essential attributes thereof and, accordingly, reference should be made to the appended claims, rather than to the foregoing specification, as indicating the scope of the invention.

I claim:

1. A method of making a steam turbine blade having (i) an airfoil partially formed from a first material and (ii) an erosion resistant trailing edge, comprising the step of forming said erosion resistant trailing edge on said airfoil by the steps of:
   (a) forming a bonding surface on said airfoil adapted to receive said erosion resistant trailing edge;
   (b) rotating a rod formed from a second material;
   (c) placing said rotating rod in contact with said airfoil bonding surface;
   (d) pressing said rotating rod against said bonding surface with an axial force, thereby plasticizing a portion of said rod adjacent said bonding surface, said pressing of said rod initially performed while simultaneously moving said rod approximately linearly relative to said bonding surface so that contact between said rod and said bonding surface is made with a running start; and
   (e) moving said rotating rod approximately linearly along said bonding surface at a predetermined speed while maintaining said axial force, thereby consuming said rod and bonding said plasticized portion of said rod to said bonding surface, whereby an erosion resistant trailing edge is formed on said airfoil.

2. The method according to claim 1, wherein said predetermined speed is in the range of approximately 2.25 to 2.75 mm/sec.

3. The method according to claim 2, wherein said rod is substantially cylindrical and has a diameter 18 mm.

4. The method according to claim 2, wherein the step of rotating said rod comprises rotating said rod at a speed in the range of approximately 320 to 340 RPM.

5. The method according to claim 4, wherein the step of pressing said rotating rod against said bonding surface with an axial force comprises pressing said rotating rod with an axial force sufficient to result in the length of said rod being consumed at a rate in the range of approximately 3.51 to 3.91 mm/sec.

6. The method according to claim 1, wherein said second material is an alloy comprising cobalt, nickel, chromium, tungsten, manganese and selenium.

7. The method according to claim 1, wherein said second material is Stellite 6B TM.

8. The method according to claim 1, wherein said first material is a ferrous alloy having approximately 11.5 to 13.0% chromium.

9. The method according to claim 1, wherein said first material is a ferrous alloy having approximately 15.5 to 17.5% chromium and 3.0 to 5.0% nickel.

10. A method of making a steam turbine blade airfoil having a first portion formed from a first material and a second portion formed from a second material, comprising the step of forming a layer of said second material on said first portion of bonding said second material to said first portion by the steps of:
    (a) forming said second material into a consumable rod;
    (b) rotating said rod; and
    (c) initially pressing said rotating rod axially against said airfoil while simultaneously moving said rod along said airfoil in a direction approximately perpendicular to the axis of rotation of said rod.

11. The method according to claim 10, wherein said first material is a ferrous alloy containing chromium and said second material is Stellite 6B TM.

12. A steam turbine blade having a root portion and an airfoil portion extending from said root portion, said airfoil portion having an edge portion and a center portion disposed adjacent said edge portion, said center portion formed from a first material, at least a first portion of said edge portion formed from a second material and bonded to said center portion, said blade made by a process comprising the steps of:
    (a) placing a rotating rod formed from said first material in contact with said center portion;
    (b) pressing said rotating rod against said center portion with an axial force, thereby plasticizing a portion of said rod adjacent said center portion, said rotating rod initially pressed against said center portion while simultaneously moving said rod approximately linearly relative to said center portion so that contact between said rod and said center portion is made with a running start; and
    (c) moving said rotating rod approximately linearly along said center portion while maintaining said axial force, thereby consuming said rod and bonding said plasticized portion of said rod to said center portion, whereby said first portion of said edge portion is formed on said center portion.

13. The steam turbine according to claim 12, wherein said second material is Stellite 6B TM material.

14. The steam turbine according to claim 13, wherein said center portion is formed from a ferrous alloy having approximately 11.5 to 13.0% chromium.

15. The steam turbine according to claim 13, wherein said center portion is formed from a ferrous alloy having approximately 15.5 to 17.5% chromium and 3.0-5.0% nickel.

16. The steam turbine according to claim 12, wherein said first edge portion is formed from an alloy comprising cobalt, nickel, chromium, tungsten, manganese and selenium.

17. The steam turbine according to claim 12, wherein said first edge portion is formed from an alloy consisting essentially of approximately 3.0% iron maximum, 3.0% nickel maximum, 28.0-32.0% chromium, 0.9-1.4% carbon, 3.5-5.5% tungsten, 1.5 molybdenum maximum, 2.0% Manganese maximum, 2.0% selenium maximum, and the balance cobalt.

* * * * *